US010728181B2

(12) United States Patent
Carpenter

(10) Patent No.: US 10,728,181 B2
(45) Date of Patent: Jul. 28, 2020

(54) ADVANCED MESSAGE QUEUING PROTOCOL (AMQP) MESSAGE BROKER AND MESSAGING CLIENT INTERACTIONS VIA DYNAMIC PROGRAMMING COMMANDS USING MESSAGE PROPERTIES

(71) Applicant: DELL PRODUCTS, L.P., Round Rock, TX (US)

(72) Inventor: Donal Carpenter, Wicklow (IE)

(73) Assignee: Dell Products, L.P., Round Rock, TX (US)

( * ) Notice: Subject to any disclaimer, the term of this patent is extended or adjusted under 35 U.S.C. 154(b) by 31 days.

(21) Appl. No.: 15/470,884

(22) Filed: Mar. 27, 2017

(65) Prior Publication Data

US 2018/0278551 A1    Sep. 27, 2018

(51) Int. Cl.
*H04L 12/861* (2013.01)
*H04L 12/46* (2006.01)
*H04L 12/703* (2013.01)

(52) U.S. Cl.
CPC ...... *H04L 49/9094* (2013.01); *H04L 12/4633* (2013.01); *H04L 45/28* (2013.01)

(58) Field of Classification Search
CPC . H04L 49/9094; H04L 12/4633; H04L 45/04; H04L 67/42
See application file for complete search history.

(56) References Cited

U.S. PATENT DOCUMENTS

| | | | |
|---|---|---|---|
| 7,974,966 B2 | 7/2011 | Robie | |
| 2010/0150139 A1* | 6/2010 | Lawson | H04M 15/00 370/352 |
| 2011/0286444 A1* | 11/2011 | Petrovykh | H04L 51/00 370/352 |
| 2012/0246337 A1* | 9/2012 | Ross | H04L 45/308 709/238 |
| 2013/0205028 A1* | 8/2013 | Crockett | G06F 9/5027 709/226 |
| 2014/0351371 A1 | 11/2014 | Smith et al. | |
| 2015/0256535 A1* | 9/2015 | Abbate | H04L 63/0853 726/9 |

(Continued)

*Primary Examiner* — Andrew Lai
*Assistant Examiner* — Chuong M Nguyen
(74) *Attorney, Agent, or Firm* — Isidore PLLC

(57) ABSTRACT

A method and an information handling system (IHS) transform an initial message having an identified protocol format to an encapsulated message having an advanced message queuing protocol (AMQP) format. A dynamic message brokering (DMB) module interacts with an AMQP client application to generate a binding key and a routing key corresponding to message attributes of the initial message. The DMB module dynamically applies one or more of the binding key and the routing key to respective programming command modules, including a provider module, to generate an AMQP client message which is forwarded to an AMQP server. The AMQP server creates a queue for messages having attributes that are identifiable within the received client message, and uses the binding key to bind the queue to a specified exchange. The AMQP server routes the received client message to the queue, using the routing key, enabling subscribers to retrieve the messages.

24 Claims, 13 Drawing Sheets

(56) References Cited

U.S. PATENT DOCUMENTS

| | | | |
|---|---|---|---|
| 2016/0174148 A1* | 6/2016 | Seed | H04W 52/0216 |
| | | | 370/311 |
| 2016/0248871 A1* | 8/2016 | Seed | H04L 67/2809 |
| 2017/0118247 A1* | 4/2017 | Hussain | H04L 41/22 |
| 2018/0115528 A1* | 4/2018 | Rotvold | H04L 67/12 |
| 2018/0167476 A1* | 6/2018 | Hoffner | H04L 67/26 |
| 2018/0316764 A1* | 11/2018 | Ferreira Gomes | H04W 4/38 |

* cited by examiner

```
An example of a Distributed Command Message
------------------------------------------------------------------------------------
[SampleMessage("Invoice.Issued", SampleDomainRegistry.SampleAlternateDomain]
public class IssueInvoiceCommand
{
        [MessageBindingKey(0)]
        public string Identifier {get; set;}

[MessageBindingKey(1)]
        public string CustomerId {get; set;}
}
```

FIG. 3A

```
Delegating distributed commands
------------------------------------------------------------------------------------
var provider = factory.GetProvider<SampleCommand>();
var simpleCommand = new SampleCommand
{
    Identifier = "Command123"
};
provider.DelegateCommand(simpleCommand);
```

Receiving distributed command messages and returning success status
------
var provider = factory.GetProvider<SampleCommand>();
var unregisterToken = provider.OnReceive(command =>
{
    return new DistributedCommandExecutionResult {ExecutionResult = CommandExecutionResult.Success};
});

Filtering distributed commands to be received
------
var provider = factory.GetProvider<FilterCommand>();
var unregisterToken = provider.OnReceive(f => f.Region == "US", command =>
{
    return new DistributedCommandExecutionResult {ExecutionResult = CommandExecutionResult.Success};
});

*FIG. 3E*

Interfaces for Sending/Receiving Distributed Commands
_____ public interface IDistributedCommandProviderFactory
{
    IDistributedCommandProvider<TDistributedCommand> GetProvider<TDistributedCommand>();
} public interface IDistributedCommandProvider<TDistributedCommand>
{
    void DelegateCommand(TDistributedCommand command);

IDistributeCommandCancellationToken OnReceive(
        Func<TDistributedCommand, IDistributedCommandExecutionResult> commandExecution);

IDistributeCommandCancellationToken OnReceive(Expression<Func<TDistributedCommand, bool>> filter,
        Func<TDistributedCommand, IDistributedCommandExecutionResult> commandExecution);

void DeleteCommandQueue(Expression<Func<TDistributedCommand, bool>> filter);
}

*FIG. 3D*

An example of a Distributed Event Message (With interface definitions)
_____ public interface IObservableStateChange
{
} public interface IObservableStateChange<out T> : IObservableStateChange
{
    T OldState { get; }

T NewState { get; }
}

[SampleMessage("SampleEntity.Changed.Something", SampleDomainRegistry.SampleEntityDomain)]
public class SampleStateChange : IObservableStateChange<int>
{
    [MessageBindingKey(0)]
    public string Identifier { get; set; } public int OldState { get; set; } public int NewState { get; set; }
}

```
Publishing Distributed State Changes
------------------------------------
var provider = factory.GetProvider<SampleStateChange>();
var msg = new SampleStateChange
{
    Identifier = "Sample123",
    NewState = 1,
    OldState = 0
};
provider.PublishStateChange(msg);
```

Interfaces implemented inside DMB for Sending/Receiving Distributed Events

```
public interface IDistributedStateObservationProviderFactory
{
    IDistributedStateObservationProvider<TObservableStateChange> GetProvider<TObservableStateChange>()
        where TObservableStateChange : IObservableStateChange, new();

IDistributedStatePublisher GetPublisher();
} public interface IDistributedStateObservationProvider<TObservableStateChange>
    where TObservableStateChange : IObservableStateChange, new()
{
    void PublishStateChange(TObservableStateChange message);

IDisposable SubscribeToChangesOfState(
        IDistributedStateObserver<TObservableStateChange> observer, BroadcastSubscriptionType broadcastSubscriptionType);
}
```

Interface to be implemented for subscribers of state change messages
-----------------------------------------------------------------------------------
public interface IDistributedStateObserver<in TObservableStateChange>
    where TObservableStateChange : IObservableStateChange
{
    void ProcessStateChange(TObservableStateChange stateChangeMessage);
}

Subscribing to Distributed State Changes once per application
-----------------------------------------------------------------------------------
var provider = factory.GetProvider<SampleStateChange>();
var observer = new SampleStateChangeObserver();
var unregisterToken = provider.SubscribeToChangesOfState(observer,
    BroadcastSubscriptionType.PerApplication);

Subscribing to Distributed State Changes for every node in the application
-----------------------------------------------------------------------------------
var provider = factory.GetProvider<SampleStateChange>();
var observer = new SampleStateChangeObserver();
var unregisterToken = provider.SubscribeToChangesOfState(observer,
    BroadcastSubscriptionType.PerNode);

FIG. 5C

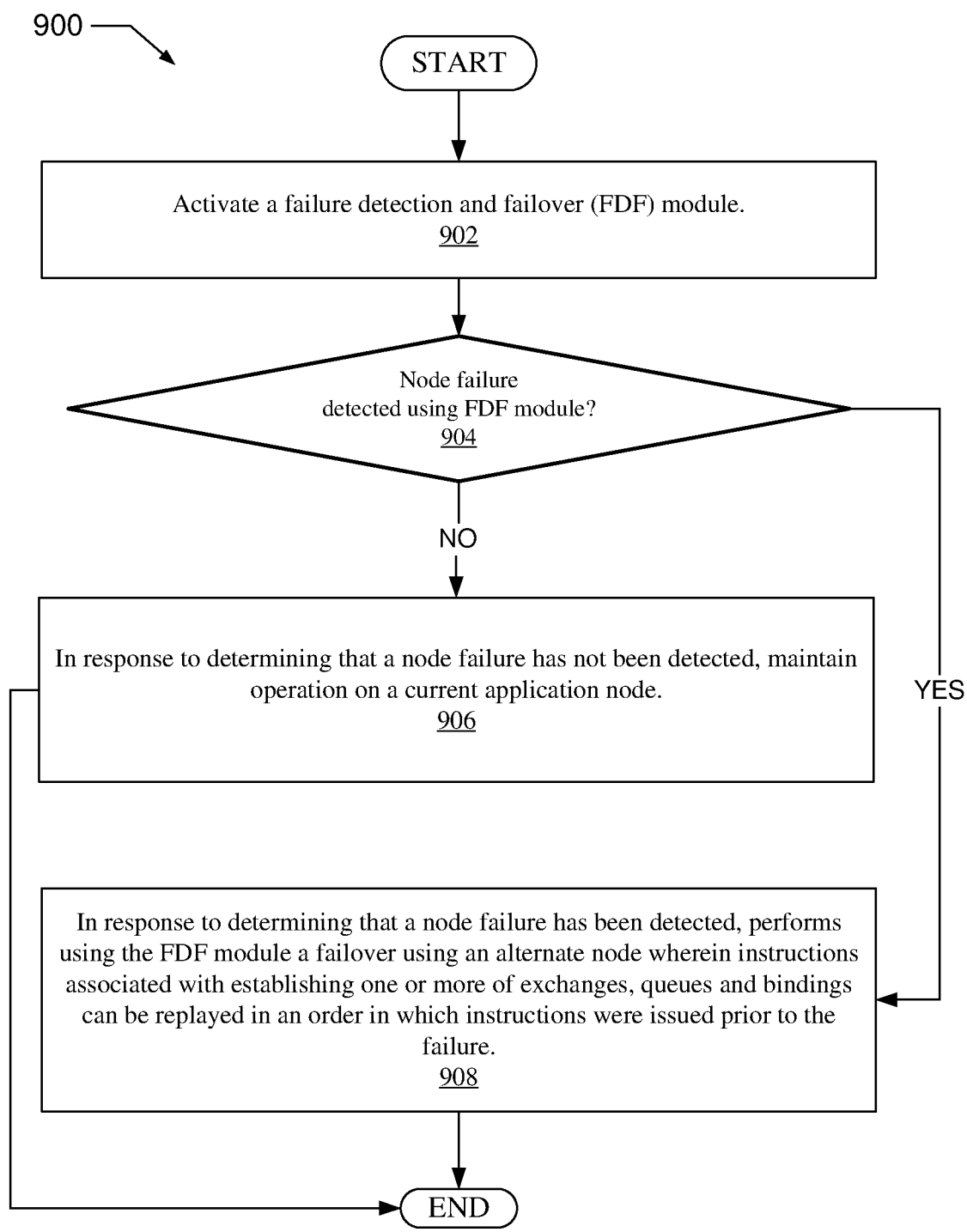

ADVANCED MESSAGE QUEUING PROTOCOL (AMQP) MESSAGE BROKER AND MESSAGING CLIENT INTERACTIONS VIA DYNAMIC PROGRAMMING COMMANDS USING MESSAGE PROPERTIES

BACKGROUND

1. Technical Field

The present disclosure generally relates to information handling systems (IHS) and in particular to an advanced message queuing protocol (AMQP) message brokering within information handling systems.

2. Description of the Related Art

As the value and use of information continue to increase, individuals and businesses seek additional ways to process and store information. One option available to users is information handling systems. An information handling system (IHS) generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The advanced message queuing protocol (AMQP) standard defines how clients should interact with an IHS server operating as a message broker. However, the AMQP standard offers little guidance to optimum practices for dealing with asynchronous messaging paradigms. Additionally, the protocol and common AMQP clients are designed with very low level message propagation and processing aspects that are orthogonal to the development of the various lines of business applications.

Traditional approaches to the challenges involving interactions between clients and a message broker include using a heavily weighted component that attempts to provide asynchronous workflows through many different types of back-ends. As a result, these approaches can only provide limited functionality. In addition, all messaging entities and infrastructure (i.e., artefacts) must be defined and established manually, or via embedded code prior to running the corresponding application. Finally, the traditional approaches generate raw messages that comprise several multiples of the payload size generated in additional message broker message headers.

BRIEF SUMMARY

Disclosed are a method and an information handling system (IHS) that transforms an initial message having an identified protocol format to an encapsulated message having an advanced message queuing protocol (AMQP) format. A dynamic message brokering (DMB) module interacts with an AMQP client application to generate a binding key and a routing key corresponding to message attributes of the initial message. The DMB module dynamically applies one or more of the binding key and the routing key to respective programming command modules, including a provider module, to generate an AMQP client message which is forwarded to an AMQP server. The AMQP server creates a queue for messages having attributes that are identifiable within the received client message, and uses the binding key to bind the queue to a specified exchange. The AMQP server routes the received client message to the queue, using the routing key, enabling subscribers to retrieve the messages.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 3A illustrates an example programming module which can be executed to enable message routing that corresponds to a specified message type, according to one or more embodiments;

FIG. 3B illustrates an example programming module for publishing the distributed command message, according to one or more embodiments;

FIG. 3C illustrates example programming code that defines an interface for receiving a distributed command message, according to one or more embodiments;

FIG. 3D illustrates example programming code that defines an interface for sending and receiving distributed command messages, according to one or more embodiments;

FIG. 3E illustrates an example programming module which can be executed to enable a client to filter incoming distributed commands, according to one or more embodiments;

FIG. 4A illustrates an example programming module showing a distributed event message, according to one or more embodiments;

FIG. 4C illustrates example programming code that defines an interface for dynamically sending and receiving distributed event messages, according to one or more embodiments;

FIG. 5A illustrates example programming code that defines an interface for allowing a client to subscribe to state change messages, according to one or more embodiments;

FIGS. 5B and 5C illustrate a set of example programming modules for enabling a client to subscribe to distributed state changes, according to one or more embodiments;

FIG. 9 is a flow chart illustrating a method for providing failure detection and failover operations by using programming commands, according to one embodiment.

DETAILED DESCRIPTION

Figure 1:
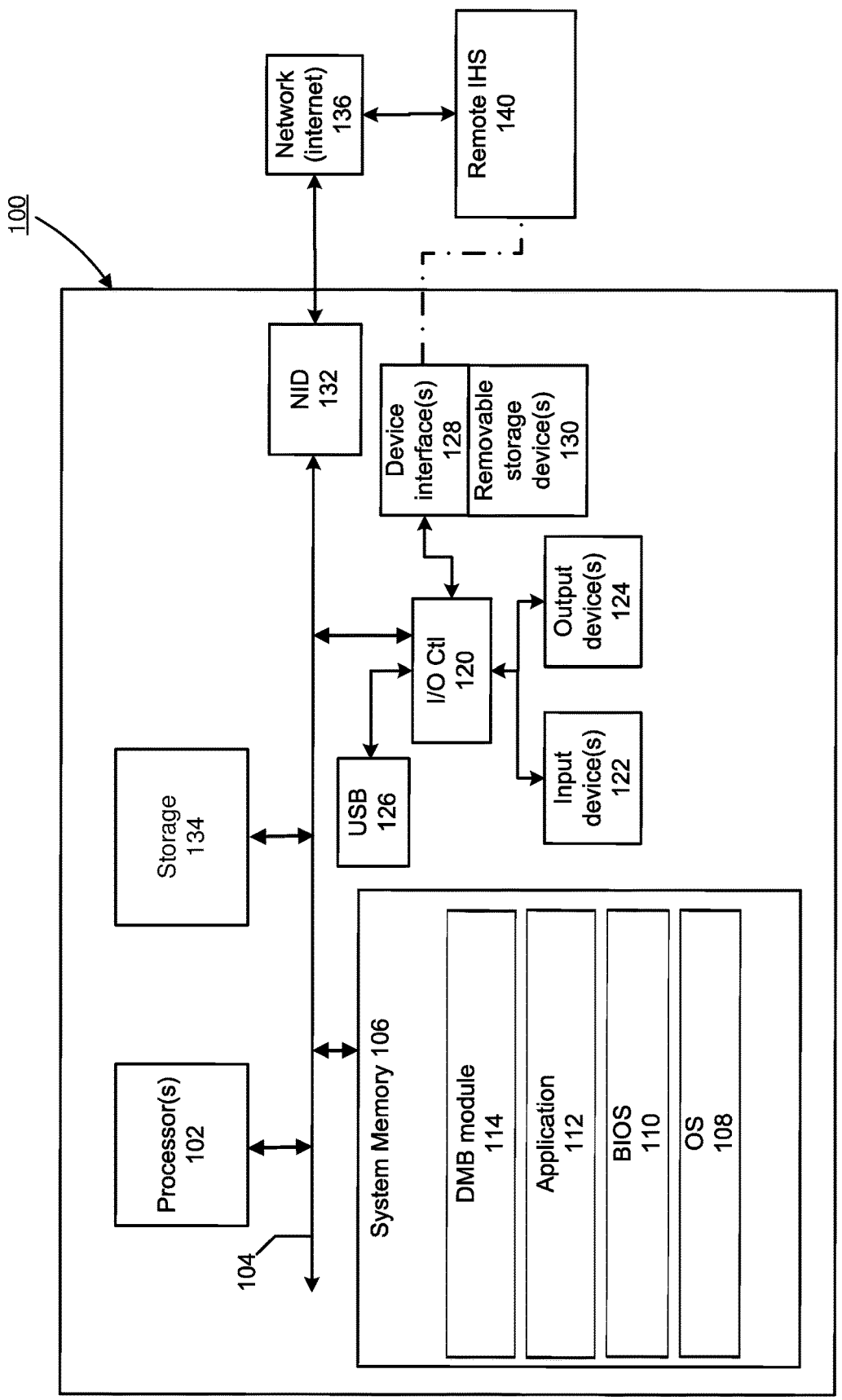
FIG. 1 illustrates an example information handling system (IHS) within which various aspects of the disclosure can be implemented, according to one or more embodiments.

The illustrative embodiments provide a method and an information handling system (IHS) that transforms an initial message having an identified protocol format to an encapsulated message having an advanced message queuing protocol (AMQP) format. A dynamic message brokering (DMB) module interacts with an AMQP client application to generate a binding key and a routing key corresponding to message attributes of the initial message. The DMB module dynamically applies one or more of the binding key and the routing key to respective programming command modules, including a provider module, to generate an AMQP client message which is forwarded to an AMQP server. The AMQP server creates a queue for messages having attributes that are identifiable within the received client message, and uses the binding key to bind the queue to a specified exchange. The AMQP server routes the received client message to the queue, using the routing key, enabling subscribers to retrieve the messages.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Those of ordinary skill in the art will appreciate that the hardware, firmware/software utility, and software components and basic configuration thereof depicted in the following figures may vary. For example, the illustrative components of the IHS are not intended to be exhaustive, but rather are representative to highlight some of the components that are utilized to implement certain of the described embodiments. For example, different configurations of an IHS may be provided, containing other devices/components, which may be used in addition to, or in place of, the hardware depicted, and may be differently configured. The depicted example is not meant to imply architectural or other limitations with respect to the presently described embodiments and/or the general invention.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 102 coupled to system memory 106 via system interconnect 104. System interconnect 104 can be interchangeably referred to as a system bus, in one or more embodiments. Also coupled to system interconnect 104 is storage 134 within which can be stored one or more software and/or firmware modules and/or data (not specifically shown). In one embodiment, storage 134 can be a hard drive or a solid state drive. The one or more software and/or firmware modules within storage 134 can be loaded into system memory 106 during operation of IHS 100. As shown, system memory 106 can include therein a plurality of modules, including operating system (O/S) 108, Basic Input/Output System (BIOS) (110), application(s) 112 and firmware (not specifically shown). Applications 112 can include multiple applications including a first application and a second application. For example, the first application can be a messaging application utilizing a first protocol, and the second application can be an AMQP client application utilizing the AMQP format. In addition, the second application can interact with the first application to enable an initial/first message generated using the first protocol to be converted to a second message using the second, AMQP format. In one or more embodiments, BIOS 110 comprises additional functionality associated with unified extensible firmware interface (UEFI), and is thus illustrated as and can be more completely referred to as BIOS/UEFI 110 in these embodiments. In addition, system memory 106 includes dynamic message brokering (DMB) module 114. The various software and/or firmware modules have varying functionality when their corresponding program code is executed by processor(s) 102, or by other processing devices within IHS 100. IHS 100 further includes one or more input/output (I/O) controllers 120, which support connection to, and processing of, signals from one or more connected input device(s) 122, such as a keyboard, mouse, touch screen, or microphone. I/O controllers 120 also support connection to, and forwarding of, output signals to one or more connected output device(s) 124, such as a monitor or display device or audio speaker(s). In addition, IHS 100 includes universal serial bus (USB) 126 which is coupled to I/O controller 120. Additionally, in one or more embodiments, one or more device interface(s) 128, such as, without limitation, an optical reader, a card reader, Personal Computer Memory Card International Association (PCMCIA) port, and/or a high-definition multimedia interface (HDMI), can be associated with IHS 100. Device interface(s) 128 can be utilized to enable data to be read from, or stored to, corresponding removable storage device(s) 130, such as a compact disk (CD), digital video disk (DVD), flash drive, or flash memory card. In one or more embodiments, device interface(s) 128 can also provide an integration point for connecting other device(s) to IHS 100. In one implementation, IHS 100 connects to remote IHS 140, such as an AMQP server/broker, using device interface(s) 128. In such implementation, device interface(s) 128 can further include General Purpose I/O interfaces such as FC, System Management Bus (SMBus), and peripheral component interconnect (PCI) buses, et al.

IHS 100 also comprises a network interface device (NID) 132. NID 132 enables IHS 100 to communicate and/or interface with other devices, services, and components that are located external to IHS 100. These devices, services, and components can interface with IHS 100 via an external network, such as example network 136, using one or more communication protocols. In particular, in one implementation, IHS 100 uses NID 132 to connect (indirectly) to remote IHS 140 via an external network, such as network 136. In the presented embodiments, remote IHS 140 is an example AMQP server.

Network 136 can be a wired local area network, a wireless wide area network, wireless personal area network, wireless local area network, and the like, and the connection to and/or between network 136 and IHS 100 can be wired or wireless or a combination thereof. For purposes of discussion, network 136 is indicated as a single collective component for simplicity. However, it is appreciated that network 136 can comprise one or more direct connections to other devices as well as a more complex set of interconnections as can exist within a wide area network, such as the Internet.

Figure 2:
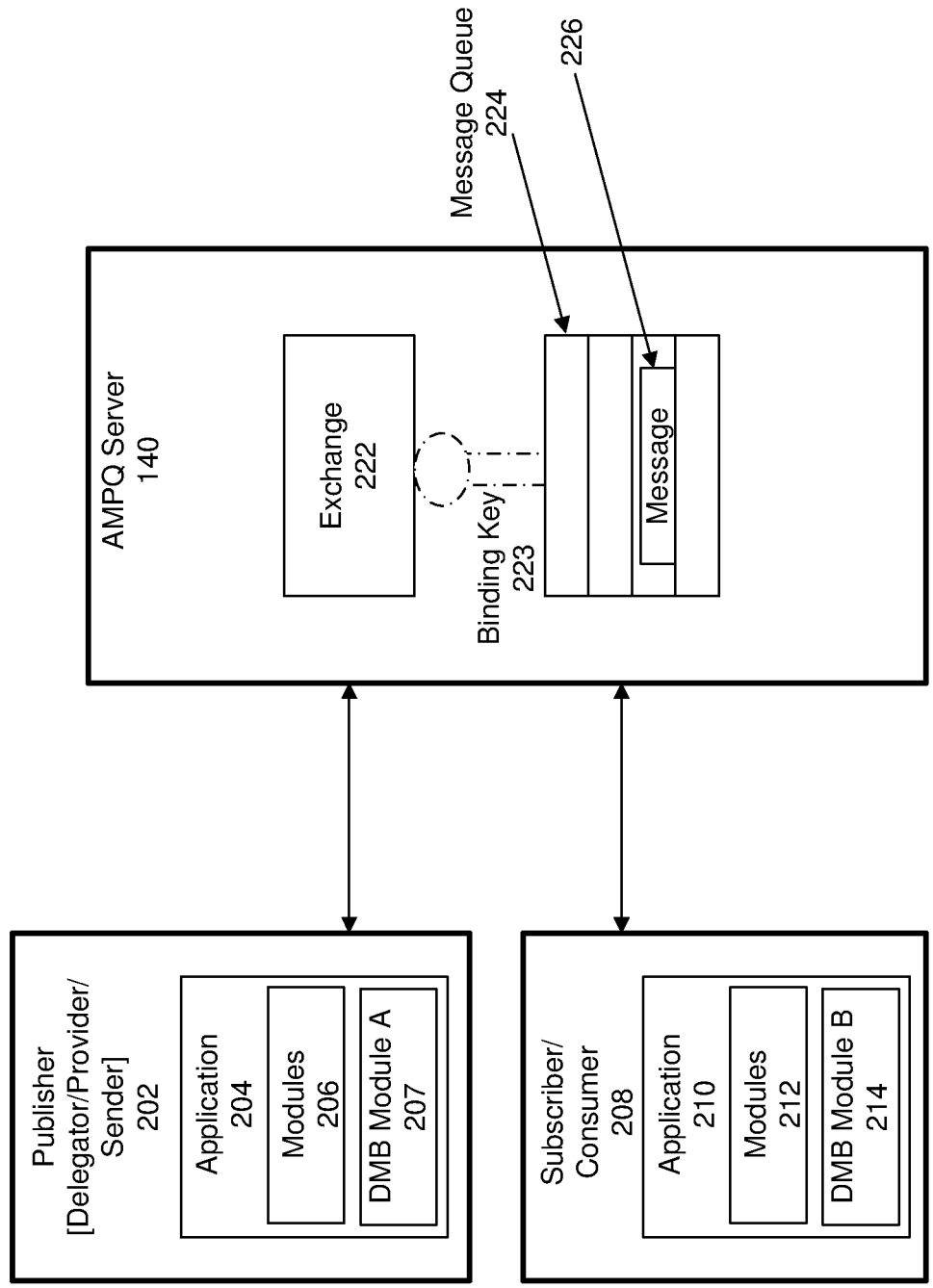
FIG. 2 depicts a block diagram illustration of an advanced message queuing protocol (AMQP) environment having an AMQP server communicating with publisher and subscriber clients, according to one or more embodiments.

FIG. 2 depicts a block diagram illustration of an advanced message queuing protocol (AMQP) environment having publisher and subscriber clients communicating with an AMPQ server. Specifically, environment 200 comprises publisher 202 and subscriber/consumer 208, each having respective client messaging applications 204, 210. Publisher 202 can be interchangeably referred to as a delegator, provider, or sender. Publisher 202 and subscriber 208 can each have a configuration similar to that of IHS 100 (FIG. 1), which is configured to operate as AMPQ client 100. Publisher 202 and subscriber 208 respectively operate within AMPQ environment 200 as an AMPQ Publisher and an AMPQ subscriber, and can be interchangeably referenced as such. AMPQ environment 200 further comprises AMPQ server 140 which is communicatively coupled to publisher 202 and subscriber 208. AMPQ server 140 includes exchange 222 and message queue 224. As illustrated, message queue 224 comprises message 226. AMPQ server 140 also includes binding key 223.

Publisher and subscriber 202, 208 include AMQP client messaging applications 204, 210 which further includes modules 206, 212, respectively. For example, modules 206, 212 include a provider creation module, a subscriber creation module, an exchange creation module, failure detection, and failover (FDF) module and various other functional modules described herein. Applications 204, 210 further comprise DMB modules 207, 214, respectively, separately identified as DMB module A 207 and DMB module B 214. DMB modules 207, 214 can selectively activate one or more modules within modules 206, 212 to support client messaging interactions.

Applications 204, 210 running on publisher and subscriber (clients) 202, 208 are able to dynamically issue, interpret and/or respond to programming instructions. According to one aspect, processor 102 (FIG. 1) executes AMQP client messaging application 204 which utilizes a program command based protocol in order to support the operations of DMB module A 207. More particularly, DMB module A 207 selectively activates one or more modules 206 of AMQP client messaging application 204 by triggering processor 102 (illustrated in FIG. 1) to execute programming code corresponding to a selected module 206.

As described herein, the program command based protocol refers to issuing of instructions using programming code, which includes classes, where each class covers a particular functionality and has a respective set of methods, the methods being operations. For example, the exchange class is a group of methods related to operations on exchanges, and a queue class is a group of methods related to operations on queues. Thus, AMQP is a programmable protocol in the sense that AMQP entities and routing schemes are defined by applications, and not by a broker administrator. Accordingly, DMB module 114 (FIG. 1) provides protocol operations that declare queues and exchanges, define bindings between queues and exchanges, and enables clients to subscribe to queues. DMB module 114 (FIG. 1) can declare the AMQP entities that are needed, define necessary routing schemes, and may choose to delete AMQP entities when they are no longer used. Declaring a queue causes the queue to be created if the queue does not already exist. The declaration will have no effect if the queue does already exist as long as the corresponding attributes are the same as those in the declaration.

According to one or more aspects, application 204 uses one or more message attributes to dynamically provide a messaging infrastructure that support client interactions. In particular, application 204 receives a first message from a client (not shown) and identifies one or more message attributes. The first message is provided using a first (client) application protocol. For example, in one implementation, the first application protocol corresponds to a .Net application. Application 204 generates a binding key and a routing key corresponding to the one or more message attributes. Application 204 includes an exchange creation sub-component/module (206) which application 204 utilizes to send corresponding programming commands to AMQP server 140 to enable AMQP server 140 to dynamically provide/create an exchange corresponding the one or more message attributes. Application 204 includes a set of established classes which includes programming commands corresponding to a program command based protocol. AMQP server 140 uses the routing key to route the message via the exchange to one or more subscriber queues. According to one or more aspects, applications 204, 210 use a provider registration and/or a subscriber registration request to trigger AMQP server 140 to generate the exchange and a message queue, and to bind the exchange to the message queue.

In order for IHS/AMQP server 140 operating as a single broker to host multiple isolated "environments" (e.g., groups of users, exchanges, queues, etc.), AMQP server 140 can provide multiple virtual hosts (vhosts) which provide completely isolated environments in which AMQP entities operate. AMQP clients specify what vhosts they want to use during AMQP connection negotiation.

According to one or more aspects, application 210 receives, from a client, a first request for subscription to messages having a specified message type. The request is provided using the first/client application protocol. Application 210 identifies the client as a subscriber based on the request. Application 210 translates the first request created using the first application protocol to a second request that utilizes the AMQP format. Application 210 utilizes the specified message type to perform the generation of a binding key. Applications 204, 210 sends the second request to AMQP server 140 to enable AMQP server 140 to create a queue designated for storing messages having the specified message type. In addition, AMQP server 140 uses the binding key to automatically bind the queue to the exchange that receives the message from the sender/publisher. As a result of binding the queue to the exchange, AMQP server 140 performs the routing by forwarding the message having the specified message type identifier from the message queue to the subscriber.

According to one or more aspects, when binding the queue to the shared command exchange, the binding key, such as "Invoice.Issued.#", is utilized. As a result, all messages published to that exchange that have a routing key starting with "Invoice.Issued" and then 0 or more "." delimited components will be accepted. A wild card for matching "IssueInvoiceCommand messages can be used, whilst also allowing for other queues to be created outside this process that can use more specific bindings, and thereby receive a subset of the overall "IssueInvoiceCommands".

FIG. 3A illustrates an example programming module which can be executed to enable message routing corresponding to a specified message type, according to one or more embodiments. Module 300 can be executed to declare the necessary AMQP artefacts such as an exchange, a queue and bindings, and for DMB module 207 to generate a routing key and payload for instances of this message type. Module 300 provides programming code corresponding to a specific message class. The message class is an abstract attribute and requires derived types to implement an identifier property and a message domain property. The identifier property is used to construct a routing key for each message instance that is addressable or contextually relevant to the message itself. The domain property is used to batch messages into relevant groups. Thus, the domain is used to create an exchange. The identifier is used to reliably bind all messages to/from this exchange to a queue that consumer 208 can read from. Application 204 activates a queue creation module included within DMB module A 207 and which provides programming code that publisher 202 sends to AMQP server 140 to enable AMQP server 140 to create a message queue. Similarly, applications 204, 210 utilize an exchange creation module included within respective modules 206, 212 to enable AMQP server 140 to create an exchange. Applications 204, 210 also activate a binding creation module (also included within modules 206, 212) to enable AMQP server 140 to bind the exchange to the queue. In order to provide programming code that enables AMQP server 140 to create the exchange, application 204, via activation of features provided by DMB module A 207, identifies a domain attribute from the one or more message attributes, and applies the identified domain attribute to the exchange creation module.

The Message Binding Key attribute, illustrated in program module 300 (FIG. 3A), works in conjunction with the identifier property of the derived MessageAttribute. The Message Binding Key is provided by injecting runtime property values into a routing key. The Message Binding Key has only one parameter, which is an integer, as indicated by "MessageBindingKey(0)" and "MessageBindingKey(1)". The integer parameter determines the position of the runtime value into the routing key. If, for example, the IssueInvoiceCommand class was instantiated with the value 'abc' for Identifier, and '3D2' for CustomerId, the resulting AMQP routing key would be Invoice.Issued.abc.3D2.

According to one or more aspects, application 204 receives from a client a request to publish event messages. Application 204 includes multiple provider factory modules which include a first provider factory module for creating a first provider for event messages and a second provider factory module for creating a second provider for command messages. The first provider publishes events while a second provider delegates commands. More particularly, a published event is received by all consumers/listeners, while a provided command is received by only one consumer. Application 204 allows a client to use events to notify consumers when there has been an change in an entity that meets certain pre-established interest criteria. For example, application 204 can publish an event indicating that an invoice status changes from "pending" to "paid". On the other hand, application 204 allows a client to use a command to send an instruction to execute a process. For example, application 204 can delegate a command requesting that a client issues a payment confirmation email. Application 204 uses first provider factory module, from within modules 206, to create a provider for handling event messages, and enables the client to operate as a publisher that is able to publish event messages. Application 204 sends the event message to AMQP server 140. AMQP server 140 utilizes a message routing key/identifier to route the received event message to an appropriate message queue. At a receiving subscriber client device, DMB module 214 uses an interface module to enable subscriber 208 to receive a notification of the event message transmitted by publisher 202. Subscriber 208 is able to retrieve message 226 from assigned message queue 224.

According to one or more aspects, using the distributed command provider module, AMQP client applications 204, 210 provide functionality for sending and receiving messages until applications 204, 210 dispose of tokens that allow the client applications to receive commands via the application provider. Applications 204, 210 utilize/include a corresponding token management module to create the tokens and to handle disposal of the tokens. Applications 204 and 210 respectively utilize queuing status modules (from within modules 206 and 212) to perform one of (a) removal of a message from a queue; (b) re-queuing a message; and (c) prevention of message re-queuing for a message that could not be processed.

According to one or more aspects, application 204 receives a request for a distributed event provider corresponding to a specific message class, and application 204 utilizes/includes provider creation module 206 that can be used to send and receive distributed event messages. Provider creation modules 206, 212 enable the client to operate as a publisher/subscriber with one or more of distributed event publishing capabilities and distributed event receiving capabilities for a message class that is specified in the request for the distributed event provider. Furthermore, provider creation module 206, 212 selectively enables one of (a) the event messages to be sent individually and (b) the event messages to be aggregated before sending as one or more aggregated blocks. Applications 204, 210 enable both event messages and command messages to use the same pattern for requesting a provider for an individual class of message.

According to one or more aspects, application 210 utilizes/includes subscriber creation module (212) that can be used to enable a client to subscribe to distributed event messages and receive published events. Subscriber creation module 212 includes an interface module that allows messaging libraries to notify a subscriber application when a message has been received. In addition, subscriber creation module 212 selectively enables the client to receive event messages on one of (a) a per application basis where a single queue is created for a corresponding application, and all application nodes can consume from the single queue, and (b) a per application node basis, where a new queue is created for each application node, using a naming mechanism that will prevent collision with other active application nodes. For example, a machine name and a process identifier can be used as differentiators.

According to one or more aspects, application 204 utilizes event broadcast module (206) to allow the application to publish an event which is a broadcast message that provides state change notification to subscribers, and for one or more subscribers to receive the state change notification of the published event via a respective provider. Event broadcast module (206, 212) enable each subscriber to be added and to be removed independently of an instantiation/registration of the publisher.

DMB module 207 activates provider creation module (206) to enable a client to operate as a sender/publisher. Provider creation module 206 includes channel and connection management (CCM) module (206) that (a) maintains communication channels, (b) tracks and logs commands issued to setup a communication infrastructure and (c) minimizes a number of redundant calls to setup entities, which include exchanges, queues and bindings. CCM module 206 is securely able to selectively close channels when corresponding tokens for registering a client as a subscriber are subsequently disposed of. Publisher and/or subscriber applications 204, 210 is used to create the tokens and to dispose of the tokens.

Publisher and/or subscriber applications 204, 210 determine whether a node failure is detected using failure detection and failover (FDF) module (206, 212). In response to publisher and/or subscriber applications 204, 210 determining that a node failure has been detected, publisher and/or subscriber applications 204, 210 perform a failover via an alternate node. Publisher and/or subscriber applications 204, 210 perform the failover by re-issuing/replaying module instructions associated with establishing one or more of exchanges, queues and bindings in a temporal order in which these instructions were previously issued prior to the failure.

According to one embodiment of the disclosure, the AMQP Client Application acts as a message subscriber and provides an instruction to register as a subscriber, the provided instruction being enriched with an expression to filter messages by specifying desired/established values for individual message properties, whereby those message properties have one or more message related attributes. Also, in the example embodiment, the AMQP server is configured to create a bespoke binding key and corresponding AMQP queue that results in a subscriber being able to receive only a subset of published messages. Thus, with this embodiment, the AMQP server performs filtering and routing of incoming messages instead of having this functionality being provided by the publishing or subscribing client applications.

FIG. 3B illustrates an example programming module for publishing the distributed command message, according to one or more embodiments. Module 310 utilizes a "Sample-Command" message class, such as the "IssueInvoiceCommand" message class defined by module 300, to create a provider for the "SampleCommand" message class and to issue a corresponding single command message.

According to one or more aspects, application 204 is able to send a distributed command message by serializing the message, with MessageBindingKey decorated properties going into the routing key while other properties are serialized and then converted into a byte array. Application 204 translates provider instructions (e.g., a set of .Net instructions) into AMQP commands. In addition to opening and subsequently closing a communication channel, application 204 when required can issue an exchange declaration command and a message publishing command. For example application 204 issues the exchange declaration command and the message publishing command as provided here:

"Exchange.Declare("SharedCommandExchangeName",
   "topic", 0, 0, 0, 0, 0, null)"; and "Basic.Publish
   ("SharedCommandExchangeName",
   "Invoice.Issued.abc{Guid}", 0, {Serialized Message-Content})".

The initial exchange declaration (i.e., "Exchange. Declare( . . . )") happens only the first time the provider is invoked for a sequence of associated message transmissions/exchanges. The "SharedCommandExchangeName" is a variable that is kept in the application configuration. The "Invoice.Issued.abc.{Guid}" is the generated routing key for the message.

FIG. 3C illustrates example programming code that defines an interface for receiving a distributed command message, according to one or more embodiments. Module 320 is executed to allow a client to receive a distributed command message corresponding to module 300, and which was issued using module 310. Module 320 also enables/triggers the return of success status.

FIG. 3D illustrates example programming code that defines an interface for sending and receiving distributed command messages, according to one or more embodiments. DMB module 207 executes module 330 to dynamically create an interface(s) for sending and/or receiving distributed command messages. Module 330 utilizes "IDistributedCommandProviderFactory" which enables a retrieval of specialist providers for operating with commands on a generic basis. "IDistributedCommandProviderFactory" represents a starting point for interacting with commands.

FIG. 3E illustrates an example programming module which can be executed to enable a client to filter incoming distributed commands, according to one or more embodiments. Module 340 is executed to provide an AMQP routing key for a corresponding command message class such as the "IssueInvoiceCommand" message class defined by module 300. DMB module 207 is able to interpret lambda expressions applied to the message class to allow specific filtered queues and binding keys to be generated on the AMQP broker. This means all filtering is performed at the broker level, and not at the application.

According to one or more aspects, a lambda expression is programming code that passes functionality as an argument to another method (i.e., a block of code), such as to indicate an action that should occur in response to a specified event. Thus, a lambda expression enables functionality to be treated as a method argument, or code as data. By using lambda expressions, one can write local functions that can be passed as arguments or returned as the value of function calls. As an anonymous function, a lambda expression which can be used to define an inline function can be written inside another function. For example, a lambda expression can be used to define an inline implementation of a functional interface.

FIG. 4A illustrates an example programming module showing an interface that is implemented on distributed event messages, according to one or more embodiments. Module 400 provides programming commands that can define the nature of the state change in the distributed event message. For example, module 400 provides the distributed event message having a message class identified as "SampleStateChange".

Figure 4B:
FIG. 4B illustrates an example programming module which can be executed to enable a client to publish distributed state changes, according to one or more embodiments.
Figure 6:
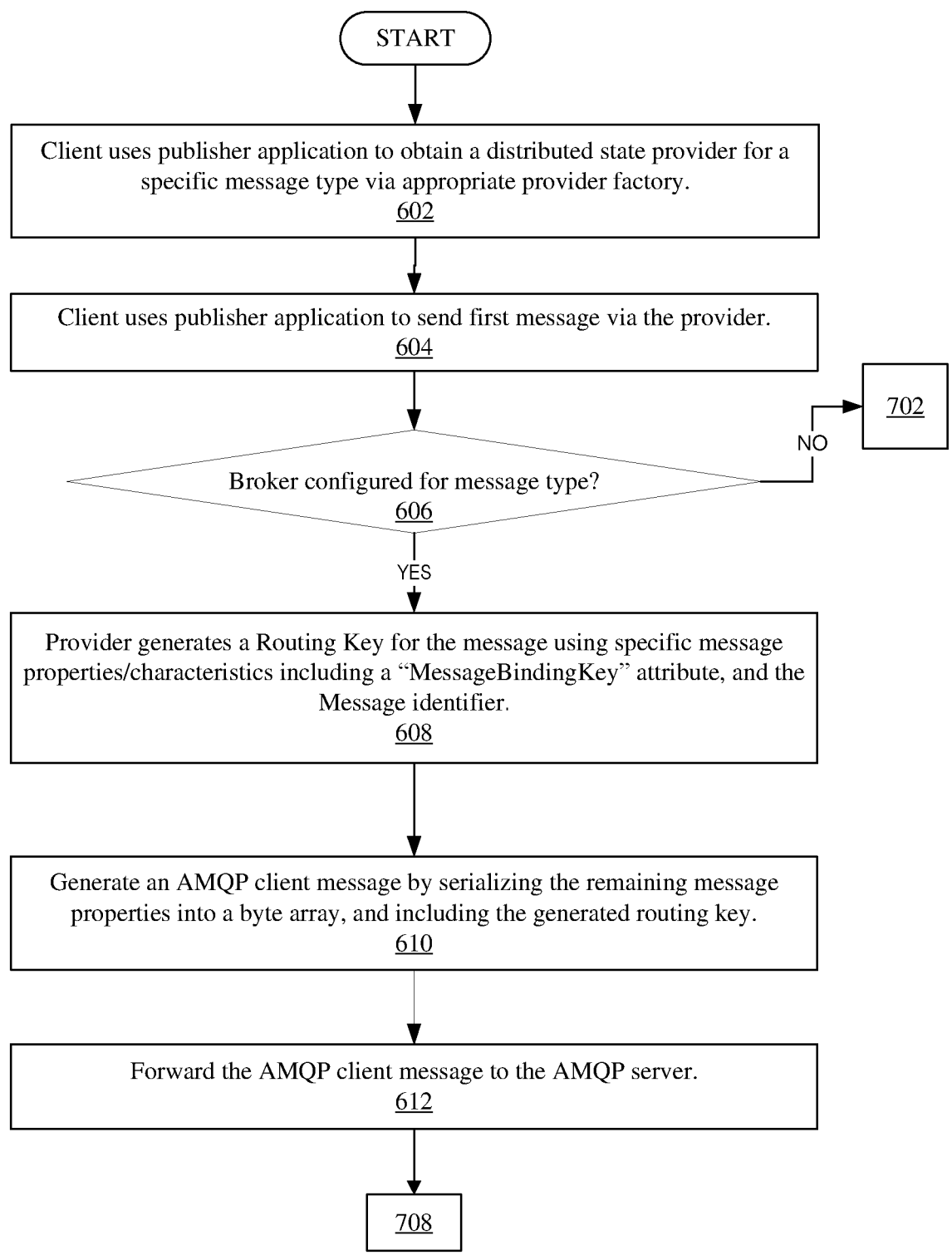
FIG. 6 is a flow chart illustrating a method for dynamically providing programming commands to enable a publisher to send messages, according to one embodiment.

FIG. 4B illustrates an example programming module which can be executed to enable a client to publish distributed state changes, according to one or more embodiments. Module 410 utilizes the "SampleStateChange" message class defined by module 400 to create a provider for the "SampleStateChange" message class and then to issue a corresponding single event message.

FIG. 4C illustrates example programming code that defines an interface for dynamically sending and receiving distributed event messages, according to one or more embodiments. DMB module 207 executes module 420 to dynamically create specialized providers for sending and/or receiving distributed event messages.

FIG. 5A illustrates an example programming code that defines an interface for allowing a client to subscribe to state change messages via an event listener, according to one or more embodiments. DMB module 214 executes module 500 to invoke the methods defined for receiving distributed event messages which were issued using module 410. Module 500 provides programming code that enables a client to receive distributed message events, where the receiving client is specifically registered as a subscriber.

In order to allow a client to participate in distributed event messaging and receive published events, application 210 creates an observer message class. The interface associated with and/or implemented by the observer message class is the "IDistributedStateObserver <TObservableStateChange>interface", and "TObservableStateChange" is the class of message that will be received. As a result of the creation of the observer message class, the messaging libraries can notify the application when a message has been received.

FIGS. 5B and 5C illustrate a set of example programming modules that enable a client to subscribe to distributed state changes, according to one or more embodiments. Modules 520 and 540 of FIGS. 5B and 5C provide programming code that enable a client to subscribe to event messages on a per application basis and on a per application node basis, respectively. More particularly, application 210 enables a client to subscribe to event messages that provide state changes on one of (a) a per application basis, where a single queue is created for a corresponding application and message class type and all application nodes can consume from the single queue, and (b) a per application node basis, where a new queue is created for each node and message class type, using a machine and a process identifier as differentiators. For example, regarding the per application node basis, if each node in an application maintains a transient state, such as that of a cache, a client may wish to have an ability to invalidate the cache. Application 210 enables the client to invalidate or refresh corresponding cached data on every node. A new queue can be created for each node on the service bus/message broker, using a naming mechanism, involving unique identifiers, that prevents collision between active application nodes. For example, the Machine Name and Process Identification can be used as differentiators.

In addition to providing commands directly associated with receiving messages, application 210 issues commands for establishing a connection/channel to enable a subscriber to receive messages. For example, publisher and/or subscriber applications 204, 210 may issue a "Channel.Open" command to establish the channel. The connection can be subsequently terminated by using a "Channel.Close" command. In setting up the infrastructure, DMB module 207/application 204 can dynamically issue a number of commands including an "Exchange.Declare( . . . )" command (i.e., an exchange declaration/creation command), a "Queue.Declare" command, and a "Queue.Bind ( . . . )" command. For example, the queue declaration can be provided using the following: "Queue.Declare ("SampleMessaging.App<Events.SampleStateChange", 0, 1, 0, 0, 0, null)", where application 204, 210 combine the executing application's name with the message type name. Furthermore, the exchange declaration can be provided using the following: "Exchange.Declare("Sample.Entity", "topic", 0, 0, 0, 0, 0, null)". To enable, a subscriber/consumer to receive the event message via the dynamically created infrastructure, application 210 can issue a "Basic.Consume( . . . )" command. For example, according to a per application subscription, application 210 issues the following: "Basic.Consume ("SampleMessaging.App<Events.SampleStateChange", {consumer-tag})". However, according to a per application node subscription, application 210 issues the following commands:

"Basic.Consume("SampleMessaging.Events.SampleStateChange.
{NodeName}.{ProcessId}", {consumer-tag})".

One or more command elements, such as the "{consumer-tag}" specification, occur transparently to the application.

FIGS. 6-9 present flowcharts illustrating example methods by which Publisher 202 and/or subscriber 208, and specifically applications 204, 210 presented within the preceding figures, perform different aspects of the processes that enable one or more embodiments of the disclosure. Method 600 represents a method for dynamically providing programming commands to enable a publisher to send messages. Method 700 represents a method for establishing a messaging infrastructure having an exchange and a queue to enable communication between a provider and a consumer(s) by using programming commands. Method 800 represents a method for dynamically providing programming commands to enable a subscriber to receive messages. Method 900 represents a method for providing failure detection and failover operations by using programming commands. The description of each method is provided with general reference to the specific components illustrated within the preceding figures. It is appreciated that certain aspects of the described methods may be implemented via other processing devices and/or execution of other code/firmware. In the discussion of FIGS. 6-9, reference is also made to elements described in FIGS. 1-5.

Figure 7:
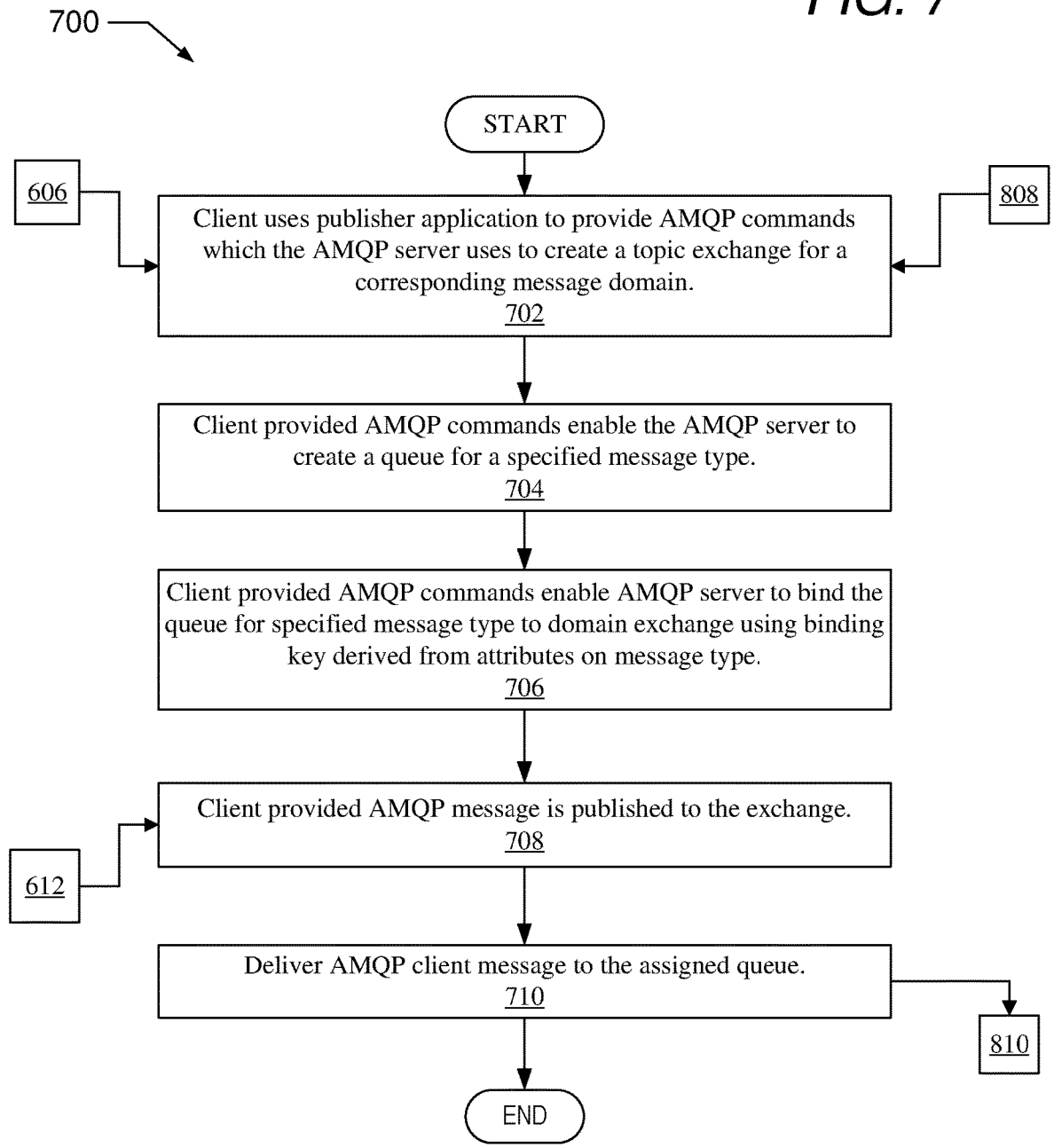
FIG. 7 is a flow chart illustrating a method for establishing a messaging infrastructure having an exchange and a queue to enable communication between a publisher and one or more subscriber(s) by using programming commands, according to one embodiment.
Figure 8:
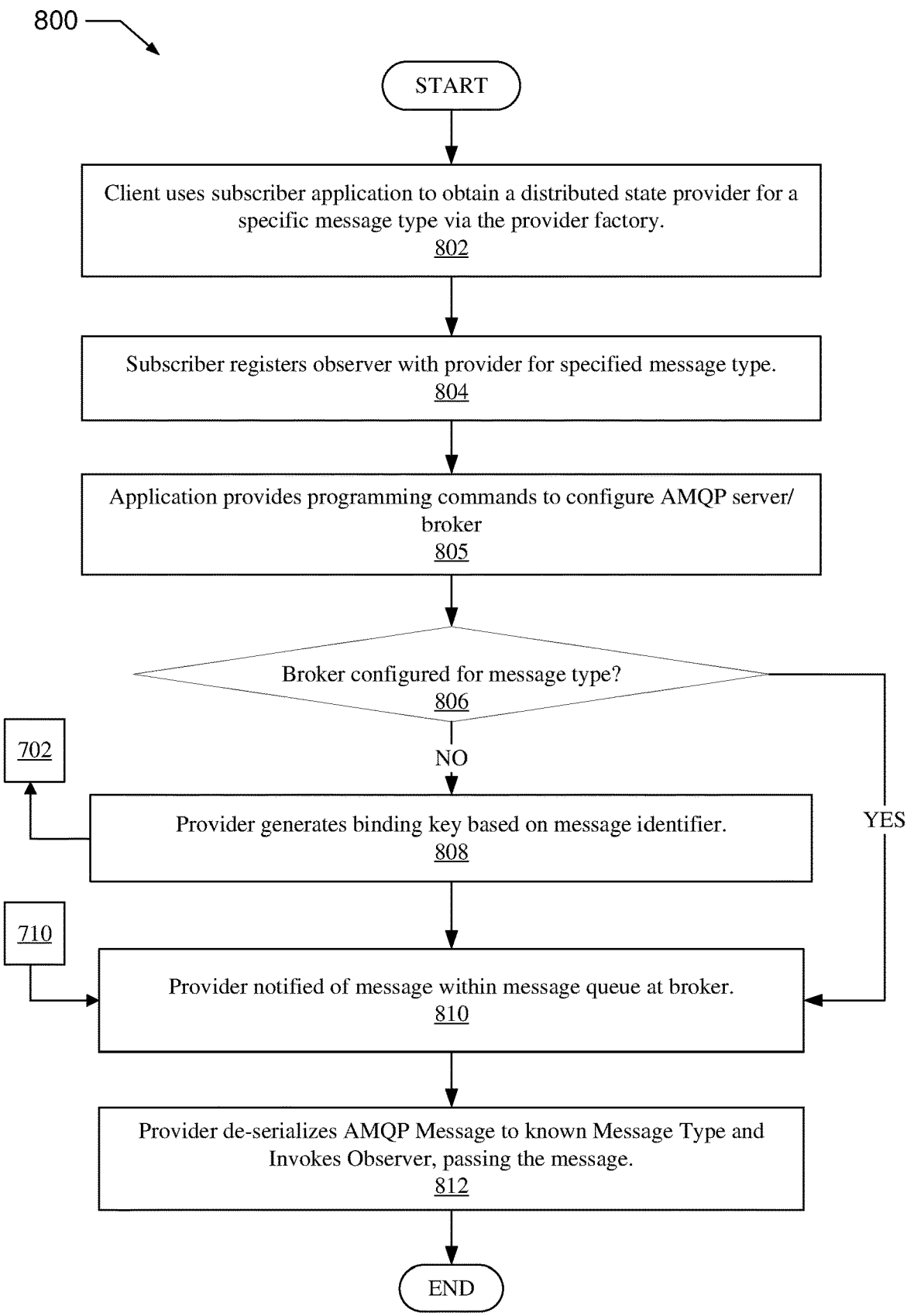
FIG. 8 is a flow chart illustrating a method for providing programming commands to enable a subscriber to receive messages, according to one embodiment.

Method 600 begins at the start block and proceeds to block 602. At block 602, application 204, using DMB 207, creates a provider via a provider factory designated for a targeted message type. Using the provider, application 204 receives, via a first application protocol, a first message from a publisher, where the first message provides one or more message attributes (block 604). Using an exchange creation module, application 204 provides programming commands to configure AMQP server/broker 140 for handling the specific message type and/or to trigger AMQP server 140 to determine whether AMQP server/broker 140 has already been configured to handle the specified message type (decision block 606). According to one aspect of the disclosure, AMQP server/broker 140 is configured to handle the specific message type when a client application 204/210 provides AMQP instructions that enable AMQP server 140 to dynamically establish/create an exchange corresponding to the one or more message attributes. According to one or more aspects, publishing application 204 provides the programming commands to enable the establishment of the exchange. However, subscriber application 210 can separately provide programming commands to establish the exchange. In any case, AMQP server 140 enables only a one time creation of the exchange. If the exchange was not already established, the process proceeds to block 702 (FIG. 7). However, if the exchange was already established, using specific message properties/characteristics which include a "MessageBindingKey" attribute, and the message identifier, DMB module 207 uses runtime values of the attributes/properties to generate a routing key corresponding to the one or more message attributes (block 608). DMB module 207 generates a byte array by serializing the (remaining) message properties that are not associated with message binding attributes and/or do not include the "MessageBindingKey" attribute. DMB module 207 combines the byte array and routing key to create an AMQP Message (block 610). Application 204/DMB module 207 forwards the create AMQP message to AMQP server 140 (block 612). The process proceeds to block 708 (FIG. 7).

Method 700 starts at block 606 (FIG. 6) at which publisher application 204, using an exchange creation module, provides to AMQP server 140 AMQP commands which include one or more message attributes. Alternatively, method 700 can similarly be initiated at block 808 (FIG. 8) at which subscriber application 210, using an exchange creation module, provides, to AMQP server 140, AMQP commands which include one or more message attributes. The process then proceeds to block 702 at which the publisher/subscriber provided AMQP commands enable AMQP server 140 to dynamically establish/create an exchange corresponding to the one or more message attributes. According to one or more aspects, DMB module 207 provides AMQP commands corresponding to a queue creation module to enable AMQP server 140 to dynamically establish/create a queue corresponding to one or more message attributes (block 704). DMB module 207/214 generates a binding key for the specified message type, in accordance with one or more message attributes, and uses a binding creation module to enable AMQP server 140 to bind the created queue for the specified message type with the exchange for the message type domain (block 706). When the AMQP server 140 receives a message sent by a client, the message is published to the exchange (block 708) which was created using the AMQP commands corresponding to block 702. In addition, AMQP server 140 is able to route the message to the bound Queue (block 710). According to one or more aspects, the process can proceed from block 612 (FIG. 6) to block 708. According to one or more aspects, the process can proceed to block 810 (FIG. 8) from block 710. The process concludes at the end block.

Method 800 begins at the start block and proceeds to block 802 at which subscriber application 210, using DMB 214, obtains a distributed state provider via an appropriate provider factory for a specific message type. Using the distributed state provider, application 210 receives, via a first application protocol, a first registration of an observer (i.e., a receiving client) for the specific message type (block 804). Using an exchange creation module, application 204 provides programming commands (block 805) to configure AMQP server/broker 140 for handling the specific message type and/or to trigger AMQP server 140 to determine whether AMQP server/broker 140 has already been configured to handle the specified message type (decision block 806). According to one aspect of the disclosure, AMQP server/broker 140 is configured to handle the specific message type when a client application 204/210 provides AMQP instructions that enable AMQP server 140 to dynamically establish/create an exchange corresponding to the one or more message attributes. According to one or more aspects, subscribing application 210 provides the programming commands to enable the establishment of the exchange. However, publisher application 204 can separately provide programming commands to establish the exchange. In any case, AMQP server 140 enables only a one-time creation of the exchange. If at decision block 806 the exchange was already established enabling AMQP server to be configured to handle the specified message type, the process proceeds to block 810. If the exchange was not already established, the process proceeds to block 808, at which DMB 214 generates a binding key for a specified message type in accordance with one or more message attributes. Following block 808, application 210 receives notification via the provider that a message corresponding to the one or more message attributes is located within the message queue at AMQP server 140 (block 810). According to one embodiment, the process can proceed to block 702 (FIG. 7) from block 808. Also, in one or more embodiments, the process can proceed to block 810 from block 710 (FIG. 7). Application 210 uses the provider to de-serialize a received AMQP message to a known message type and invokes/establishes an "Observer" in order to receive the message (block 812). According to one or more aspects, DMB 214 receives the raw AMQP message and translates the components of the routing key and the byte array content to reconstitute the original message and pass the reconstituted message to the registered "Observer" for the message type that was identified at block 804.

Method 900 begins at the start block and proceeds to block 902 at which DMB module 207 activates a failure detection and failover (FDF) module (206) of application 204 (block 902). DMB module 207/application 204 determines whether node failure has been detected, using FDF module 206 (decision block 904). In response to determining that a node failure has not been detected, application 204 maintains messaging operations on a current application node (block 906). However, in response to determining that a node failure has been detected, using FDF module 206, application 204 performs a failover using an alternate node, where instructions associated with establishing one or more of exchanges, queues, and bindings can be re-issued/replayed in an order in which instructions were issued prior to the failure (block 908). The process concludes at the end block.

In the above described flow charts, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An information handling system (IHS) comprising:
a memory system having an advanced message queuing protocol (AMQP) client application which utilizes a program command based protocol to enable interactions between publishers and subscribers; and
a processor communicatively coupled to the memory system and which executes the AMQP client application to enable the IHS to:
receive a first message created using an application protocol, wherein the first message provides one or more message attributes;
transmit, using an AMQP format, the one or more message attributes and a message type identifier to an AMQP server to enable said AMQP server to dynamically establish an exchange using the one or more message attributes and the message type identifier;
forward, using the AMQP format, one or more identified message attributes and the message type identifier to the AMQP server to enable said AMQP server to dynamically establish a message queue using the one or more identified message attributes and the message type identifier;
wherein the AMQP server selectively forwards one or more messages, originating from a publishing application to the message queue from which one or more registered subscribers can retrieve the selectively forwarded one or more messages; and
enable the AMQP client application to: create tokens for allowing the AMPQ client application to receive commands via an application provider; and handle disposal of the created tokens, wherein the AMPQ client application receives commands via the application provider until tokens for allowing the client application to receive commands are disposed of.

2. The IHS of claim 1, wherein the AMQP client application operates as a publisher application, and the processor:
generates a routing key corresponding to the one or more message attributes and one or more values specific to an instance of the message;
generates a second message having an AMQP format using the first message and the routing key; and
forwards the second message to the AMQP server;
wherein said AMQP server, in response to receiving said second message, uses the routing key to dynamically route the second message via the exchange to one or more subscriber queues.

3. The IHS of claim 2, wherein the second message is an event message, wherein the processor:
enables the AMQP server to provide, to all subscribing client application instances, a notification that the second message has been generated;
wherein the processor selectively indicates via the notification whether an identifiable data type has been changed and encapsulates information about a corresponding data change when a change occurs.

4. The IHS of claim 2, wherein the second message is a command message, wherein the processor:
enables, using the second message, the AMQP server to provide, to a single client application instance, a notification that the second message has been generated; and
selectively indicates via the notification that an operation that can be triggered using the client application should be invoked, and encapsulates the data needed to perform said operation.

5. The IHS of claim 4, wherein the processor:
in response to the operation triggered by the command message being completed, performs one of (a) removal of the message from a queue; (b) re-queuing of the message; and (c) prevention of message re-queuing for a message that could not be processed.

6. The IHS of claim 1, wherein the processor:
provides an instruction to said AMQP server to register said client application as a subscriber application, the provided instruction being used to filter messages by specifying values for individual message properties, whereby the message properties have one or more message related attributes;
wherein the AMQP server is configured to dynamically create a binding key and the corresponding AMQP queue that results in a registered subscriber being able to receive only a subset of published messages; and
wherein one or more AMQP formatted instructions provided to the AMQP server enables the AMQP server to perform filtering and routing of incoming messages.

7. The IHS of claim 1, wherein the processor:
generates a binding key corresponding to the one or more message type attributes; and
transmits, using the AMQP format, the generated binding key to the AMQP server to enable said AMQP server to configure the established queue by binding said established queue to said established exchange for a specified message domain, using the generated binding key.

8. The IHS of claim 1, wherein the processor:
identifies a domain attribute from the one or more message attributes; and
transmits, using the AMQP format, the identified domain attribute to the AMQP server to enable the AMQP server to create the exchange which corresponds to the identified domain attribute;
wherein the created AMQP exchange enables an incoming message to be dynamically routed based on a routing key that is provided in said incoming message.

9. The IHS of claim 1, wherein the processor;
receives a publisher registration request from a client to enable the client to send messages having a specified message class;
identifies the client as a publisher based on the request and the specified message class; and
forwards distributed event messages received from the publisher to one or more subscribers via the AMQP server; and
wherein the publisher is configured with one or more of distributed event publishing capabilities and distributed event receiving capabilities.

10. The IHS of claim 1, wherein the processor:
enables a client to operate as a subscriber with distributed event message subscribing capabilities; and
notifies a subscriber application when a message has been received;
wherein the processor selectively enables the client to receive event messages on one of (a) a per application basis whereby a single queue is created for a corresponding application and all application nodes can consume from the single queue, and (b) a per application node basis whereby a new queue is created for each application node, using a naming mechanism, involving unique identifiers, that prevents collision between active application nodes.

11. The IHS of claim 1, wherein the processor:
enables the client application operating as a publisher to send a broadcast message that provides state change notification and for one or more subscribers to receive the state change notification of the broadcast message via a respective client application;
wherein the processor enables each subscriber to be added and to be removed independently of a registration of the publisher.

12. The IHS of claim 1, wherein the processor:
executes a channel and connection management (CCM) module that (a) maintains communication channels with the AMQP server, (b) tracks and logs commands issued to setup a messaging infrastructure and (c) minimizes a number of redundant calls to setup entities which include exchanges, queues and bindings; and
wherein the processor-executed CCM module is securely able to selectively close channels when corresponding tokens for registering a client as a subscriber are subsequently disposed of.

13. The IHS of claim 1, wherein the processor:
determines whether a node failure is detected; and
in response to determining that a node failure has been detected, performs a failover via an alternate node, wherein instructions associated with establishing one or more of exchanges, queues, and bindings can be replayed in an order in which the instructions were issued prior to the failure.

14. In an information handling system (IHS), a processor-implemented method comprising:
receiving a first message created using an application protocol, wherein the first message provides one or more message attributes;
transmitting, using an advanced message queuing protocol (AMQP) format, the one or more message attributes and a message type identifier to an AMQP server to enable said AMQP server to dynamically establish an exchange using the one or more message attributes and the message type identifier;
forwarding, using the AMQP format, one or more identified message attributes and a message type identifier to the AMQP server to enable said AMQP server to dynamically establish a message queue using the one or more identified message attributes and the message type identifier;
wherein the AMQP server selectively forwards one or more messages, including the first message, originating from a publishing application to the message queue from which one or more registered subscribers can retrieve the forwarded one or more messages; and
enabling an AMQP client application to: create tokens for allowing the AMPQ client application to receive commands via an application provider; and handle disposal of the created tokens, wherein the AMPQ client application receives commands via the application provider until tokens for allowing the client application to receive commands are disposed of.

15. The method of claim 14, further comprising:
sending AMQP formatted instructions to the AMQP server to register said AMQP client application to operate as a publisher application;
generating a routing key corresponding to the one or more message attributes and one or more values specific to an instance of the message;
generating a second message having an AMQP format using the first message and the routing key; and
forwarding the second message to the AMQP server;
wherein said AMQP server, in response to receiving said second message, uses the routing key to dynamically route the second message via the exchange to one or more subscriber queues.

16. The method of claim 15, wherein the second message is an event message, the method further comprising:
enabling the AMQP server to provide, to all subscribing client application instances, a notification that the second message has been generated;
wherein the processor selectively indicates via the notification whether an identifiable data type has been changed and encapsulates information about a corresponding data change when a change occurs.

17. The method of claim 15, wherein the second message is a command message, the method further comprising:
enabling, using the second message, the AMQP server to provide, to a single client application instance, a notification that the second message has been generated;
selectively indicating via the notification that an operation that can be triggered using the client application should be invoked, and encapsulates the data needed to perform said operation; and
in response to the operation triggered by the command message being completed, performing one of (a) removal of the message from a queue; (b) re-queuing of the message; and (c) prevention of message re-queuing for a message that could not be processed.

18. The method of claim 14, further comprising:
providing an instruction to said AMQP server to register said client application as a subscriber application, the provided instruction being used to filter messages by specifying values for individual message properties, whereby the message properties have one or more message related attributes;
wherein the AMQP server is configured to dynamically create a binding key and the corresponding AMQP queue that results in a registered subscriber being able to receive only a subset of published messages; and
wherein one or more AMQP formatted instructions provided to the AMQP server enables the AMQP server to perform filtering and routing of incoming messages.

19. The method of claim 14, further comprising:
generating a binding key corresponding to the one or more message type attributes;
transmitting, using the AMQP format, the generated binding key to the AMQP server to enable said AMQP server to configure the established queue by binding said established queue to said established exchange for a specified message domain, using the generated binding key.

20. The method of claim 14, further comprising:
identifying a domain attribute from the one or more message attributes; and
transmitting, using the AMQP format, the identified domain attribute to the AMQP server to enable the AMQP server to create the exchange which corresponds to the identified domain attribute;
wherein the created AMQP exchange enables an incoming message to be dynamically routed based on the routing key that is provided in said incoming message.

21. The method of claim 14, further comprising:
receiving a publisher registration request from a client to enable the client to send messages having a specified message class;

identifying the client as a publisher based on the request and the specified message class; and forwarding distributed event messages received from the publisher to one or more subscribers via the AMQP server; and wherein the publisher is configured with one or more of distributed event publishing capabilities and distributed event receiving capabilities.

22. The method of claim 14, further comprising:

enabling a client to operate as a subscriber with distributed event message subscribing capabilities; and notifying a subscriber application when a message has been received;

wherein the processor selectively enables the client to receive event messages on one of (a) a per application basis whereby a single queue is created for a corresponding application and all application nodes can consume from the single queue, and (b) a per application node basis whereby a new queue is created for each application node, using a naming mechanism, involving unique identifiers, that prevents collision between active application nodes.

23. The method of claim 14, further comprising:

enabling the client application to operate as a publisher and to send a broadcast message that provides state change notification and for one or more subscribers to receive the state change notification of the broadcast message via a respective client application;

wherein the processor enables each subscriber to be added and to be removed independently of a registration of the publisher.

24. The method of claim 14, further comprising:

executing, via the processor of the IHS, a channel and connection management (CCM) module that (a) maintains communication channels with the AMQP server, (b) tracks and logs commands issued to setup a messaging infrastructure and (c) minimizes a number of redundant calls to setup entities which include exchanges, queues and bindings; and wherein the processor-executed CCM module is securely able to selectively close channels when corresponding tokens for registering a client.

\* \* \* \* \*